United States Patent [19]

Denton et al.

[11] 3,801,078

[45] Apr. 2, 1974

[54] THERMOSTATICALLY CONTROLLED VALVE ASSEMBLY

[75] Inventors: Douglas Graham Denton, Leigh-on-Sea, England; John Meldrum MacKay, Wishaw, Scotland

[73] Assignee: Ford Motor Company, Dearborn, Mich.

[22] Filed: Feb. 28, 1973

[21] Appl. No.: 336,595

[52] U.S. Cl............... 236/93, 236/101, 123/122 H
[51] Int. Cl............................................ F02m 31/00
[58] Field of Search ................ 236/13, 93, 99, 101; 123/122 H

[56] References Cited
UNITED STATES PATENTS
3,653,366   4/1972   Hoferer........................ 123/122 H Primary Examiner—William E. Wayner
Attorney, Agent, or Firm—Roger E. Erickson; Keith L. Zerschling

[57] ABSTRACT

A thermostatically controlled valve assembly suitable for use as an inlet air temperature control device of an automobile engine. A thermostat moves a pivotally mounted flap against a main spring as the temperature rises to increase the ratio of ambient air to heated air. In this invention the functions of the flap hinge, the main spring and an override spring are performed by a spring configuration formed from a single piece of spring stock.

9 Claims, 3 Drawing Figures

THERMOSTATICALLY CONTROLLED VALVE ASSEMBLY

BACKGROUND AND SUMMARY OF THE INVENTION

The typical thermostatically controlled flap valve assembly used as an air inlet temperature control device for an engine utilizes a flap member pivotally mounted to an air cleaner inlet duct by one or more pins, a thermostatically actuated plunger including an override spring and main spring distinct from the override spring interconnecting the flap valve and inlet duct.

This invention provides a valve assembly functionally similar to the valve assembly just described but requiring significantly fewer separate parts to accomplish its function. The invention further provides a thermostatically controlled flap valve assembly in which a single spring member acts as a flap pivot, a main spring and an override spring. The invention also provides a valve structure economical to produce, reliable in operation and readily adaptable for use in present day automobile engines.

A thermostatically controlled valve assembly constructed in accordance with this invention includes duct structure onto which a flap member is pivotable between first and second positions to regulate flow through the duct structure. A spring includes at least one uncoiled segment which pin joins the flap member to the duct structure. The spring also includes a first coiled portion, coaxial with the uncoiled segment, that acts between the flap member and duct structure to bias the flap member toward the first position. A second coiled portion of the spring, having an axis parallel to but spaced from the previously mentioned axis, includes a lever pivotable about the axis of the second coiled portion.

A thermostat or temperature sensitive means is mounted to the duct structure and includes an element movable in response to changes in temperature. A motion transfer means or push-rod is engagable with the movable element and the lever to pivotally displace the flap member in response to temperature changes.

The lever is biased against the flap member by the second coiled portion of the spring. The lever maintains its position relative to the flap member during travel from the first position to the second position but is displaced relative to the flap member against the bias of the second coiled portion as the motion transfer means continues its movement in the same direction following displacement of the flap member from the first position to the second position.

BRIEF DESCRIPTION OF THE DRAWINGS

FIG. 3 is a diagrammatic view of the coil spring taken a direction into and perpendicular to the plane of the FIG. 1 representation.

DETAILED DESCRIPTION OF A PREFERRED EMBODIMENT

Figure 1:
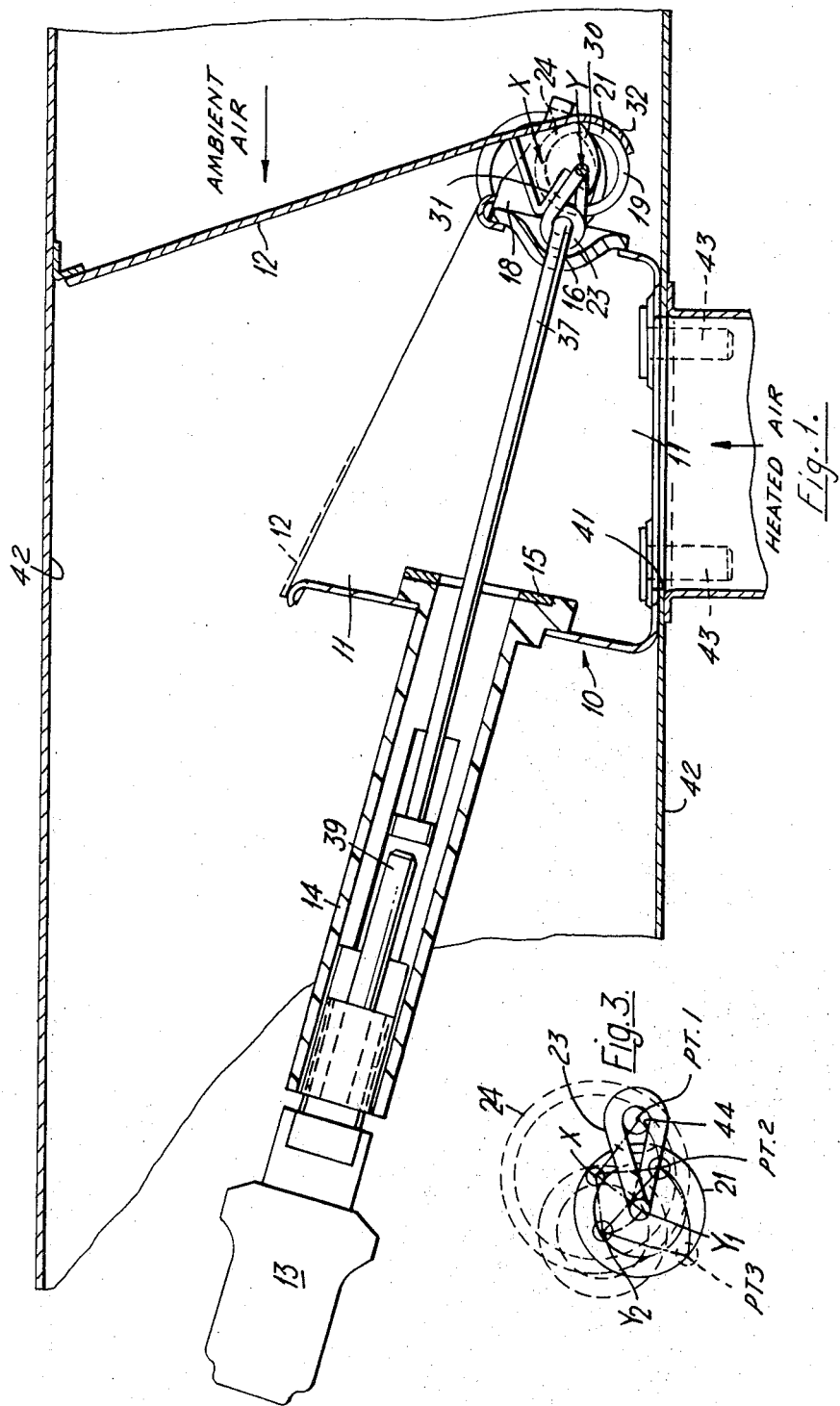
FIG. 1 is a cross-sectional view of a flap valve assembly constructed in accordance with this invention for the air intake cleaner of an internal combustion engine.
Figure 2:
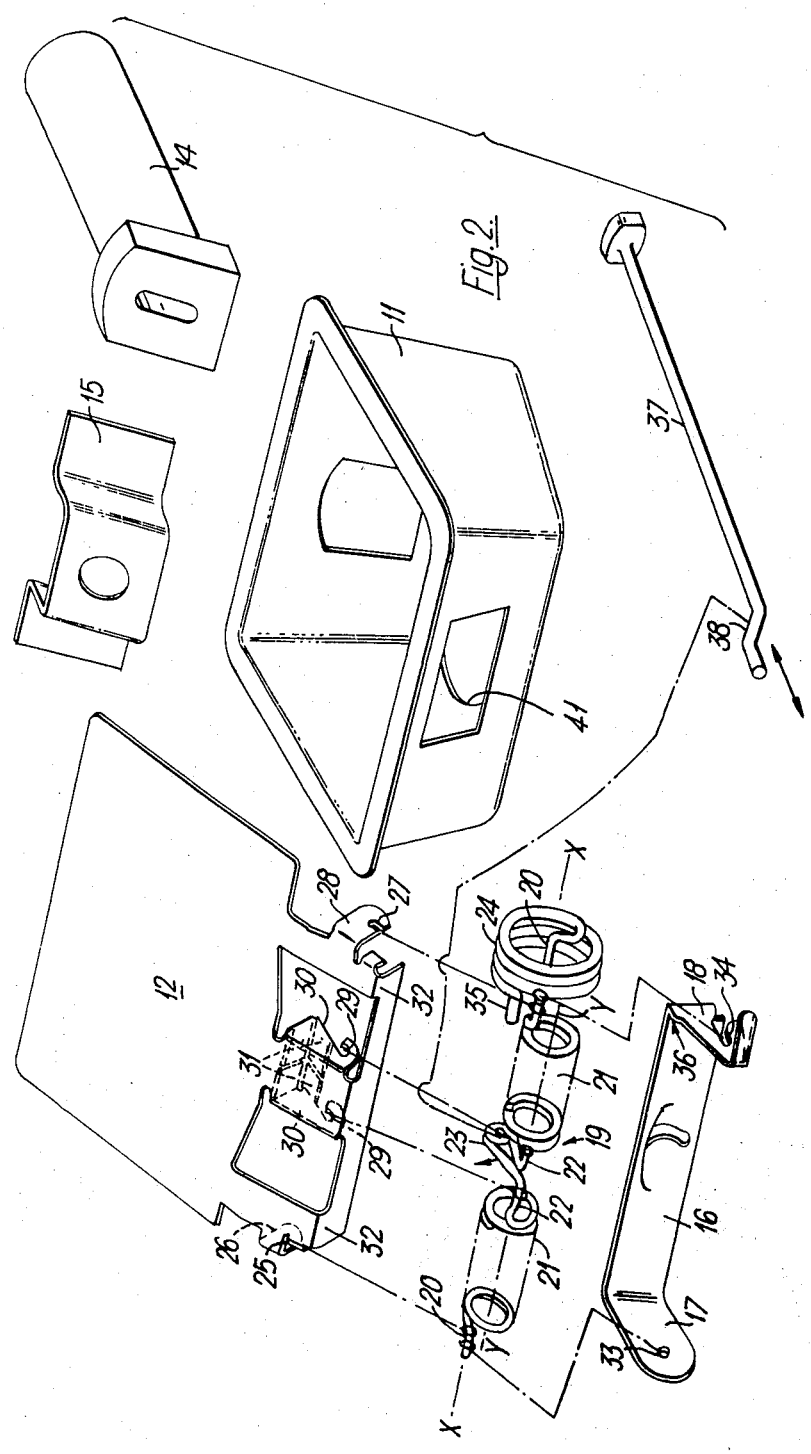
FIG. 2 is an exploded perspective view of the valve assembly of FIG. 1.

FIGS. 1 and 2 show a flap valve assembly 10 for use in a hot/cold air cleaner assembly in an internal combustion engine of a motor vehicle.

The valve assembly 10 includes a hot air inlet duct 11 connected through opening 41 to a supply of air heated by the engine exhaust manifold (not shown). The duct 11 is mounted within the cold (ambient) air inlet duct 42 of the air cleaner by bolts 43. A flap valve 12 is pivotally mounted on the duct 11. The position of the flap valve 12 is controlled by a temperature sensitive means or thermostat 13 positioned in the inlet duct of the air cleaner downstream of the flap valve 12.

If the air passing over the thermostat 13 is cooler than a lower design magnitude, the flap valve 12 is in the hot only position illustrated in full lines in FIG. 1 in which it closes the cold air inlet duct 42 and opens the hot air inlet duct 11. If the air passing over the thermostat element is warmer than a higher design magnitude the flap valve 12 is in the cold only position illustrated in dotted lines in FIG. 1 in which it closes the hot air inlet duct 11 and opens the cold air inlet duct 42.

The thermostat element 13 is fixed into one end of a molded plastics material mounting tube 14. The other end of the tube 14 is secured to the hot air duct 11 by a keeper plate 15 welded to the hot air duct 11.

A pivot bracket 16 is welded to the upstream side of the duct 11 opposite to the thermostat element 13. A pair of support arms 17 and 18 are formed integrally with the pivot bracket 16.

A multi-function coil spring 19 is formed with a pair of pivot portions 20 extending axially along axis $x$—$x$. Between the tportions 20 the coil spring 19 comprises two helical coil spring sections 21 wound in opposite senses about axis $y$—$y$ to form an override spring joined by a pair of axially extending intermediate portions 22 also extending along axis $y$—$y$ and a loop or lever arm 23. Axis $y$—$y$ is parallel to but offset from the axis $x$—$x$. The loop 23 is formed between intermediate portions 22 and defines an opening or hole 44. Axis $x$—$x$ lies along the periphery of the override spring sections 21.

A main spring 24 is formed as a helical coil of larger diameter than the override spring sections 21 coaxial with the $x$—$x$ axis.

The coil spring 19 is assembled with the flap 12 by inserting the pivot portion 20 at the free end of the spring into an aperture 25 formed in a downwardly extending ear 26 at one side of the flap 12 and inserting the other pivot portion 20 into a slot 27 formed downwardly extending ear 28 at the other side of the flap 12.

The loop 23 is then rotated in a counterclockwise direction as viewed in the direction of the main spring 24 in FIG. 1 in order to preload the override spring sections 21. To retain the spring 19 in position as shown in FIG. 1, the intermediate portions 22 are then engaged with slots 29 in ears 30 which depend from the flap 12. The loop 23 then resiliently engages abutments 31 projecting inwardly from the ears 30. The outside ends of the override spring 21 are prevented from rotating about axis $x$—$x$ relatively to the flap by engagement with the undersurface of the flap 12 which is turned over at 32 to follow the contour of the override spring 21.

The flap 12 and coil spring 19 are then assembled with the duct 11 by inserting the free pivot portion 20 into an aperture 33 in the support arm 17 and inserting the other pivot portion 20 into a slot 34 in the support arm 18. Main spring 24 is then wound up and its end 35 engaged with support arm 18 at point 36 to urge the flap 12 toward the hot only position, as shown by its solid link representation in FIG. 1.

A push-rod 37 slidable in the mounting tube 14 has an end portion 38 perpendicular to the general extent of rod 37 pivotally connected to the loop 23 at opening 44.

In cold inlet air or cold-start conditions the thermostat 13 assumes the position shown in FIG. 1 and there is a clearance between the thermostat actuator or movable member 39 and the push-rod 37 with the flap 12 in the hot only position. The configuration of the spring 19 in this situation is illustrated diagrammatically in full lines in FIG. 3, the loop opening 44 being then centered on point 1.

As the temperature of the air passing over the thermostat 13 increases above the lower design magnitude, the actuator element moves along the tube 14 and contacts the push-rod 37 and the flap 23 begins to pivot about the $x-x$ axis as it move toward the cold air only position. The $y-y$ axis moves with the flap from position $Y_1$ to position $Y_2$ in FIG. 3.

The loop 23 turns about the $x-x$ axis as it moves from point 1 toward point 2 in FIG. 3 and the main spring 24 winds up but the override spring maintains the loop 23 in contact with abutments 31 because the preload in the override spring is greater than the load in the main spring.

As the inlet air reaches the higher design magnitude the flap 12 engages the duct 11 and can move no further. The center of opening 44 of lever 23 is then at point 2 in FIG. 3.

If the inlet air temperature increases above the highe design magnitude the push-rod 37 is further displaced by the actuator 39. This further movement winds up the override spring but not the main spring as both the $x-x$ and $y-y$ axes remain fixed and the center of opening 44 of loop 23 moves from point 2 toward point 3 in FIG. 3, now turning about the $y-y$ axis at position $Y_2$.

The movement described above is reversed as the temperature of the inlet air falls.

Modifications and alterations will occur to those skilled in the art included within the scope of the following claims.

We claim:

1. A thermostatically controlled valve assembly suitable for use as an inlet air temperature control device in an internal combustion engine,
   said engine including duct structure,
   said valve assembly including a flap member pivotally movable between first and second extreme positions to regulate flow through said duct structure,
   said flap member being pivotable about a first axis fixed relative to said duct structure,
   spring means including
      at least one uncoiled segment coaxial with said first axis pin joining said flap member to said duct structure,
      a first coiled portion coaxial with said first axis acting between said flap member and said duct structure to bias said flap member toward said first position,
      a second coiled portion coaxial with a second axis parallel to but spaced from said first axis,
      said second coiled portion including a lever means pivotable substantially about said second axis,
   retaining means on said flap member engaging said second coiled portion and maintaining said second coiled portion in a preloaded condition,
   temperature sensitive means mounted to said duct structure and having an element movable relative to said duct structure in response to changes in temperature,
   motion transfer means interconnecting said lever means and said movable element for at least a portion of the range of movement of said movable element to move said flap member toward said second position in response to increases in temperature sensed by said temperature sensitive means,
   said lever means being biased against said flap member by said second coiled portion and fixed relative to said flap member during movement of said flap member about said first axis from the first position to the second position,
   said lever means being pivotable about said second axis relative to said flap member upon continued movement of said movable element in direction from the first position to the second position when said flap member is in the second position.

2. A valve assembly according to claim 1,
   said second coiled portion of said spring means comprising a pair of coiled segments wound in opposite directions and separated by said lever means,
   said lever means and said pair of coiled segments being joined along said second axis,
   said retaining means engaging said second coiled portion adjacent the junctions of said lever means and said pair of coiled segments.

3. A valve assembly according to claim 1,
   said lever means being an integrally formed portion of said spring means.

4. A valve assembly according to claim 2,
   said lever means being an integrally formed portion of said spring means.

5. A valve assembly according to claim 1,
   said duct structure defining first, second and third duct means, said third duct means being upstream of said first and second duct means to receive flow therefrom,
   the first extreme position of said flap member joining the first duct means and the third duct means,
   the second extreme position of said flap member joining the second duct means and the third duct means.

6. A valve assembly according to claim 2,
   said duct structure defining first, second and third duct means, said third duct means being upstream of said first and second duct means to receive flow therefrom,
   the first extreme position of said flap member joining the first duct means and the third duct means,
   the second extreme position of said flap member joining the second duct means and the third duct means.

7. A valve assembly according to claim 3,
   said duct structure defining first, second and third duct means, said third duct means being upstream of said first and second duct means to receive flow therefrom, the first extreme position of said flap member joining the first duct means and the third duct means, the second extreme position of said flap member joining the second duct means and the third duct means.

8. A valve assembly according to claim 1, said motion transfer means comprising a push rod pivotally connected to said lever means and abutting said movable element during at least a portion of its travel.

9. A valve assembly according to claim 2, said motion transfer means comprising a push rod pivotally connected to said lever means and abutting said movable element during at least a portion of its travel.

* * * * *